United States Patent [19]

Trattner

[11] 4,397,920

[45] Aug. 9, 1983

[54] ADAPTER PERMITTING SMALLER SIZE BATTERY CELL TO FUNCTION IN LARGER SIZE APPLICATIONS

[76] Inventor: Burton C. Trattner, 416 Clubhouse Ct., Coram, N.Y. 11727

[21] Appl. No.: 297,891

[22] Filed: Aug. 31, 1981

[51] Int. Cl.³ .............................................. H01M 2/10
[52] U.S. Cl. ...................................... 429/100; 429/121
[58] Field of Search ..................... 429/100, 99, 98, 97, 429/96, 1, 121

[56] References Cited

U.S. PATENT DOCUMENTS

| | | | |
|---|---|---|---|
| 3,684,583 | 8/1972 | Lehnen et al. | 429/100 |
| 3,887,393 | 6/1975 | La Rue | 429/99 |
| 3,969,148 | 7/1976 | Trattner | 429/100 |
| 3,990,919 | 11/1976 | Krueger | 429/100 |
| 4,037,026 | 7/1977 | Mabuchi | 429/100 |
| 4,091,187 | 5/1978 | Kaye | 429/100 |
| 4,123,598 | 10/1978 | Hammel | 429/99 |

FOREIGN PATENT DOCUMENTS

| | | | |
|---|---|---|---|
| 2439206 | 11/1974 | Fed. Rep. of Germany | 429/100 |
| 55-141065 | 11/1980 | Japan | 429/100 |

Primary Examiner—Donald L. Walton
Attorney, Agent, or Firm—Nolte and Nolte

[57] ABSTRACT

Adapter for permitting a smaller standard size battery to be used in applications requiring dimensionally larger standard size battery cells. The adapter can be economically formed of plastic and is intended to permit an AA size cell to be used in C and D cell applications and a specially arranged metallic contact is provided at one end in conjunction with a stop member which prevents the repeated insertions of the AA size cell from crushing a resilient member integrally formed with the electrical contact member. The adapter can be formed in two halves and can be secured together by means of an outer label, thereby eliminating the necessity for glues and adhesives to hold the halves together.

10 Claims, 7 Drawing Figures

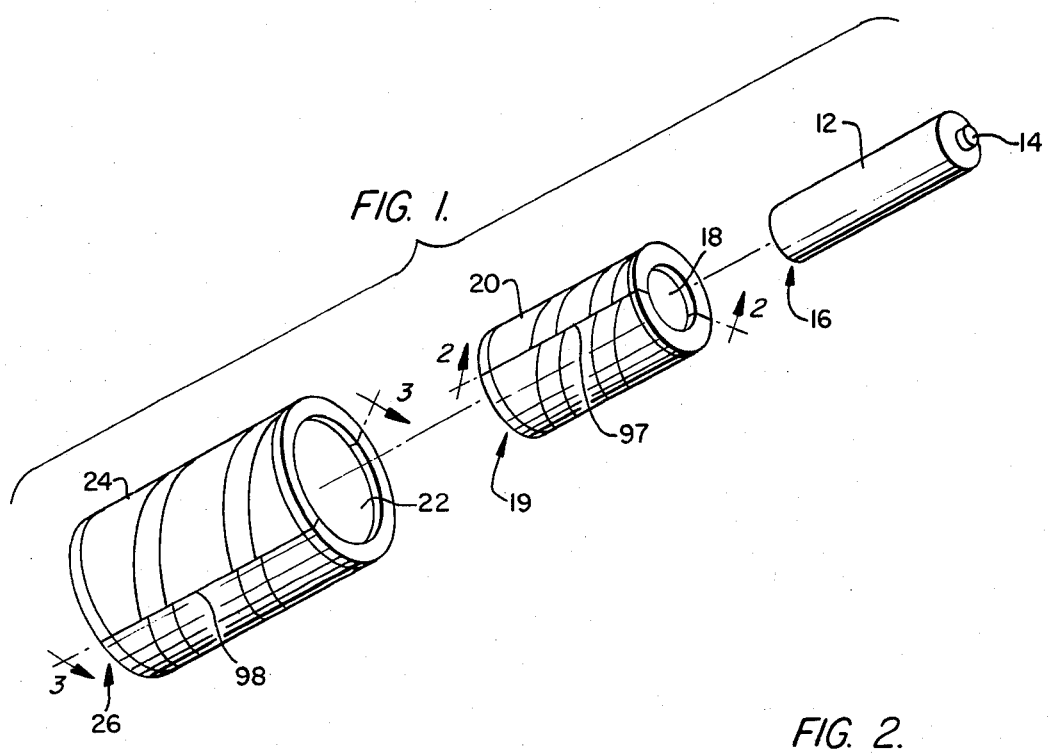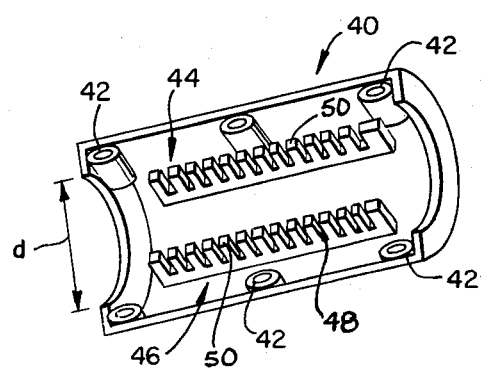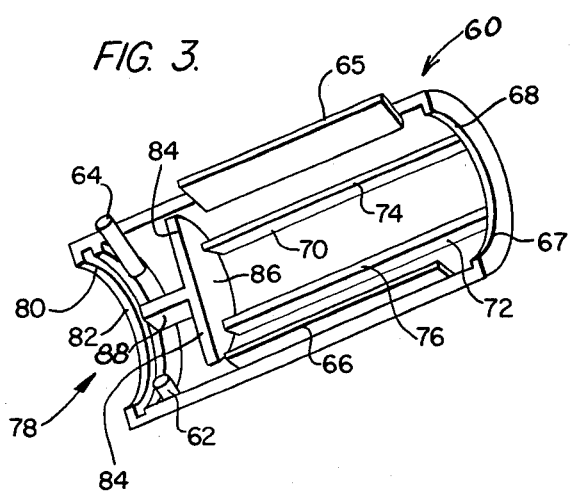

ADAPTER PERMITTING SMALLER SIZE BATTERY CELL TO FUNCTION IN LARGER SIZE APPLICATIONS

BACKGROUND OF THE INVENTION

The present invention relates to battery adapters and, specifically, to adapters for permitting a small size rechargeable battery to be used in applications where it is electrically acceptable but is too small dimensionally.

Battery adapters have been known for some time but generally have been intended for use with nonstandard size batteries. Particularly, this known type of adapter has been intended for use with those rechargeable batteries known as "sub-C" cells. Such adapters are shown in U.S. Pat. Nos. 3,684,583 and 4,037,026. These prior art adapters typically have been characterized by a complicated configuration of internal struts and support members necessary to capture and to support the cell and also by a mechanically complex electrical contact which is needed in order to make electrical contact at the standard dimensional points typical of the battery size being simulated.

U.S. Pat. No. 3,969,148 by the present inventor relates to an adapter that is intended to be used with conventional size batteries other than the nonstandard "sub-C" cell size. This adapter has proven to be a commercially successful idea, however, various drawbacks in manufacturing and production have been found, not the least of which is the manner in which the electrical contact must be made when adapting an AA size cell to a D size cell application.

BRIEF SUMMARY OF THE INVENTION

The present invention provides a specialized adapter particularly intended to permit rechargable AA size batteries to be used for both C size applications and D size applications. Additionally, the inventive adapter has a specially constructed contact member to be used when the AA size is being adapted to the D size. The present invention is specifically designed to be economically manufactured from plastic materials using either the extrusion process or the injection molding process.

An additional feature is the use of an integrally formed stop means at the bottom of the D size adapter adjacent the electrical contact member that acts to prevent this electrical contact member from being crushed and losing its resiliency required to obtain a wiping action of the battery contacts during repeated insertions of the AA size cell.

Accordingly, it is an object of the present invention to provide a battery adapter for adapting a standard AA or C size cell to multiple applications requiring larger standard sized cell.

It is another object of the present invention to provide a battery adapter which can be manufactured economically.

It is yet another object of the present invention to provide a battery adapter formed in two segments secured together by an outer circumferential wrapper.

The manner in which these and other objects are achieved by the present invention will become clear from the following detailed description of the invention.

BRIEF DESCRIPTION OF THE DRAWINGS

FIG. 1 is a perspective of an AA size battery cell, an inventive C size adapter, and an inventive D size adapter in juxtaposition;

FIG. 2 is a perspective in cross section of the inventive C size adapter taken along section lines 2—2 of FIG. 1;

FIG. 3 is a perspective in cross section of the inventive D size adapter of FIG. 1 taken along section lines 3—3 of FIG. 1;

DETAILED DESCRIPTION OF THE INVENTION

Figure 4:
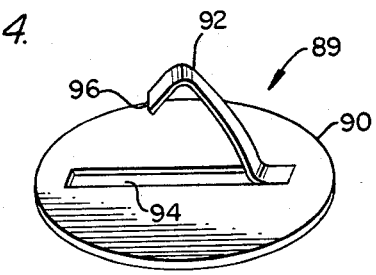
FIG. 4 is a perspective of the inventive spring contact element.

Turning now to FIG. 1, the adapters of the present invention are shown in exploded relationship with respect to a conventional battery. Specifically, the batter 12 is a conventional AA size cell having a positive electrical contact button 14. The bottom surface, not shown but indicated at 16, represents the negative terminal. The AA size cell 12 is to be inserted into either open end 18 or 19 of the C size adapter 20. A standard C size battery is the same length as an AA size cell and only the diameter differs, therefore, no additional electrical contact arrangement is required and the AA cell 12 can be inserted into either end of the C cell adapter 20. In this particular embodiment, when adapting the AA size to a D size cell a further adapter for the D cell is provided and in that situation the AA size cell 12 is slipped into either end 18 or 19 of the C size adapter 20 and that combination is inserted into opening 22 of the inventive D cell adapter 24. Because the D cell is physically longer than either an AA or a C, a special contact arrangement (not shown in FIG. 1) is provided at the end 26 of the D cell adapter that corresponds to the negative terminal 16 of the AA size battery 12. Although this embodiment employs an intermediate adapter 20, the D cell adapter 24 can be dimensioned in keeping with the present invention to accept directly an AA cell 12.

FIG. 2 is a cross-sectional view of one embodiment of the C cell adapter 20 of FIG. 1. This particular embodiment is intended to be injection molded of styrene plastic and only one half 40 of the entire adapter is shown in FIG. 2. This adapter half 40 is what might be considered the female half of the adapter and has holes or receptacles shown typically at 42, into which corresponding pegs or posts in the opposite adapter half (not shown) are inserted. The AA size battery 12 is retained in the embodiment of FIG. 2 by means of internally arranged retainers, two of which are shown at 44 and 46. The opening 18 of FIG. 1, which is formed by each half of the adapter having semicircular openings is of a diameter "d" slightly larger than the typical diameter of an AA cell. This slight oversize is necessary in order to accomodate battery manufacturing tolerances and also to take into account variations in battery diameters presented by the large number of battery manufacturers. In the embodiment of FIG. 2, the retainers 44, 46 are formed having comb-like teeth 48, the upper surface 50 of each tooth coming into contact with the outer cylindrical surface of the battery. The surfaces 50 define a cylinder which is slightly less in diameter than the battery diameter and, thus, are deformed or deflected somewhat upon insertion of the battery. Again, this slight oversize also takes into account battery diameter tolerances. The individual retainer elements need not be formed in a comb-like fashion but that configuration permits deflection without undue distortion of the adapter, especially when using rigid or hard plastics. Also, each retainer 44, 46 is radially arranged to present the proper surface of the imaginary cylinder for holding the battery.

Turning to FIG. 3, which is the D cell adapter 24 of FIG. 1 taken in cross-section along lines 3—3, again only one half of a complete assembly is shown. This embodiment is also intended to be injection molded of styrene plastic and the two halves joined together to form a D cell adapter. This half 60 might be considered as a male half and is provided with two pegs or posts, 62 and 64, which are inserted into the corresponding holes or receptacles in the female half (not shown). The pegs and holes retain the bottom of the adapter in alignment and two elongated flange members 65 and 66 cooperate with slots or relieved portions on the inside of the side walls of the corresponding adapter half. These flanges 65, 66 and the relieved slots into which they fit prevent any relative lateral movement of the upper portions of the adapter halves and, thus, the adapter halves are maintained in alignment.

Adapter half 60 is also formed with a semicircular opening 67 that together with its counterpart (not shown) make up circular opening 22 of adapter 24 in FIG. 1. This semicircular opening 67 is provided with a flat surface 68 that again defines a diameter slightly larger than the diameter of a standard C-size cell. Corresponding to the internal arranged retainers 44, 46 of FIG. 2 the adapter of FIG. 3 provides internal retainers 70 and 72 provided with interfacing surfaces 74, 76, respectively, that come into contact with the outer cylindrical surface of the battery for retaining it.

Because the standard D size cell is longer dimensionally than the standard AA and C sizes, it is necessary to provide some means of making electrical contact at the negative terminal end 78 of this embodiment. To accomplish this a specialized thin metal disc having a spring contact member, shown in detail in FIG. 4, is inserted into a slot 80 formed in a semicircular rim 82 at the end of adapter half 60 opposite rim 66. The slot 80 is also semicircular in extent and is of a width only slightly greater than the thickness of the metal contact disc.

The spring contact member is an upraised element and contacts the negative terminal end 16 of the AA cell 12. To prevent the AA cell 12 and C adapter 20 combination from crushing the spring contact member when they are inserted into opening 22, an inner stop or abutment surface is provided. This stop is formed of two elements, one of which is seen at 84. The upper surface 86 of stop 84 serves to locate the end of the AA cell-C cell combination, so that the positive terminal 14 of the AA cell is slightly above the end of the D adapter 24 and, thus, available for electrical contact in the same fashion as a standard D cell. The stop 84 is formed as a chord of the semicircular adapter 60 of a length less than a diameter of the adapter and is symmetrically arranged in the semicircular adapter 60. This has the effect that when the two halves of the adapter are joined the two complementarys tops form a slot therebetween. It is through this slot that the spring contact element protrudes and makes electrical contact with the negative terminal 16 of the AA cell 12, or with the negative terminal of a conventional C cell. Thus, an AA cell may be modified to D size by means of a C size adapter. Alternatively, a C size cell may be modified to D size by means of the D size adapter. The stop 84 can be reinforced or supported by a strut 88 which stiffens the stop 84 and prevents deformation. By using a specially constructed spring and having it protrude through the slot a certain distance each time a battery is inserted into the adapter the spring is deformed and a wiping action takes place, this tends to provide excellent electrical contact. The negative terminal of the combination formed with the D cell adapter 24 is provided by the outer flat surface of the disc-shaped contact element. This surface is substantially at the end of the adapter 24 save only for the slight thickness of the end rim outside of the slot 80. This coincides exactly with the end configuration of almost all popular D cell designs.

Referring now to FIG. 4, the specially constructed spring contact is shown. This contact 89 is preferably formed of spring-tempered brass and may be nickel plated to prevent subsequent corrosion. The contact 89 could also be formed of tin-plated or zinc-plated steel. The contact is initially formed as a flat disc 90 having a thickness of at least 0.020 inches and in its final state has an upraised curved contact element 92 which passes through the gap or slot formed between the bottom stops 84 in the construction of FIG. 3 and makes contact with the negative terminal of the AA or C size battery. It is this upraised curved element 92 which is arcuately displaced upon insertion of a battery and which provides the wiping action that yields improved electrical contact. This spring contact member 92 is originally in the plane of the flat disc of spring tempered brass. The spring contact member 92 is advantageously formed by cutting a three-sided slot 94 in the disc 90 and bending the resultant strip to have a hook-shaped end 96. One method to form the inventive spring contact in this fashion is by means of a punch press and die, whereby the spring contact is struck out from the original disc. The forming of the spring contact 92 from the original disc 90 may be accomplished in as many operations as desired, however, the brass is of such softness and the material sufficiently thin that a single stamping operation should be sufficient to form these contacts. This specific construction of the spring contact element is intended to be used in any of the various embodiments taught in the present application.

The embodiment of FIG. 3 is shown requiring the use of a C-sized adapter for use with an AA size cell, however, by changing the dimensions of the opening 22, the top rim 66, and the internal elements 70, 72 the D cell adapter can accomodate an AA cell and adapt same to D cell applications without requiring an intermediate adapter. The lower portion and spring contact of the D cell adapter remain the same.

Referring back to FIG. 1 each adapter 20 and 24 is provided with a wrap-around label 97, 98 respectively. As seen in FIGS. 2 and 3, each adapter in this embodiment is formed of two halves that are joined together to form a complete functional adapter, and in some cases requiring an additional electrical contact member. The halves can be cemented together, induction welded, or fastened in any conventional manner. Nevertheless, the present invention also contemplates forming each half with positive interlocking means, such as pegs/holes and flanges/slots, to prevent lateral misalignment and then using the outer identifying label to hold the halves together. The labels 97, 98 then are slightly longer than the circumference of the respective adapter and may be coated with adhesive on the back area. The labels are tightly wrapped around the adapter to form an integral mechanical structure. The labels 97, 98 are shown in FIG. 1 having a striped design and being in slight misalignment so as to emphasize the presence and function of this circumferential wrapper.

Figure 5:
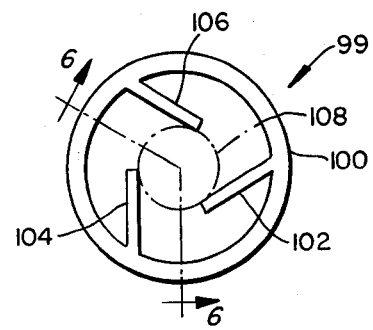
FIG. 5 is a top plan view of an alternate embodiment of the inventive adapter.

In FIG. 5 an end elevational view of an alternate embodiment 99 of the present invention is shown. Specifically, in this embodiment the adapter is intended to go directly from an AA size cell to a D size cell and this embodiment is intended to be manufactured by an extrusion process. Thus, the outside diameter of the adapter 100 is equal to the outside diameter of a conventional D size battery. Arranged internally to this adapter 100 are three angularly arranged ribs 102, 104, and 106. The inboard edges of these ribs define an imaginary cylinder, shown by dashed line 108, slightly smaller than the diameter of a conventional AA size cell.

Figure 6:
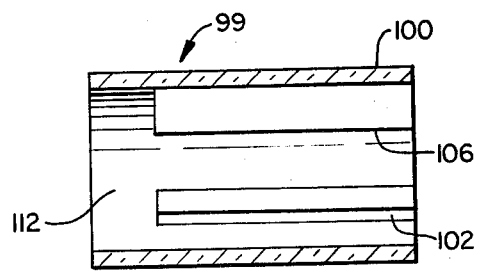
FIG. 6 is a side elevation in cross section of the adapter of FIG. 5 taken along section lines 6—6.
Figure 7:
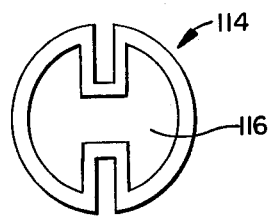
FIG. 7 is a top plan view of an end element for use in the alternate embodiment of FIG. 6.

Since a D cell is longer than an AA size cell it is necessary to provide a means for making electrical contact over this longer length, and reference is had to FIG. 6, which is a cross section taken along section lines 6—6 of FIG. 5, wherein ribs 102 and 106 may be seen. The length of each rib 102, 104, 106 is approximately equal in length to an AA size battery and the additional length of the D cell adapter 100 is then an open space shown generally at 112. Into this space is placed a spacer 114 shown in a top plan view in FIG. 7. The spacer 114 has a thickness or height equal to the depth of the open space 112 and has an outer diameter approximately equal to the diameter of the open space 112. The spacer 114 has an open center area 116 through which the upraised spring contact portion 92 of the metal spring contact member 89 of FIG. 4 protrudes. The spacer 114 of FIG. 6 and the contact 89 of FIG. 4 can be pressed into or cemented or glued into the bottom void 112 of the adapter 100.

It should also be understood that certain embodiments are shown employing a two piece adapter, i.e., employing an AA cell to a C and then to a D cell, however, any and all of the embodiments may be dimensioned to go directly from an AA to a D or to use the intermediate C cell adapter.

It is understood further that the preceding is presented by way of example only is not intended to limit the scope of the present invention except as set forth in the appended claims.

What I claim is:

1. An adapter for permitting a first standard size battery to be used in place of a second, larger standard size battery, comprising:
    a tubular means of a diameter and length substantially equal to the diameter and length of the second, larger standard size battery;
    an opening in one end of said tubular means of a diameter larger than the diameter of the first standard size battery;
    support means arranged inside said tubular means for defining an imaginary cylinder smaller in diameter than the cylinder presented by the first standard size battery;
    stop means arranged inside said tubular means at a distance from said one end equal to the length of the first standard size battery, said stop means having a slot formed therein of a size less than the size of the end of the first size battery;
    disc-shaped, metallic electrical contact means arranged in the second end of said tubular means for presenting an electrical contact surface substantially coplanar with said second end of said tubular means and having a resilient contact means comprising a centrally arranged upraised curved strip formed from said disc for protruding through said slot in said stop means for making electrical contact with an end of the first size battery, whereby upon inserting the first size battery into said opening for a distance to abut said stop means, the combination can be used in place of the second larger size battery.

2. The adapter of claim 1, wherein said metallic electrical contact means if formed of spring tempered brass.

3. The adapter of claim 1, wherein said metallic electrical contact means is formed of tin-plated steel.

4. The adapter of claim 1, wherein said metallic electrical contact means is formed of zinc-plated steel.

5. The adapter of claim 1, wherein said aperture is a slot.

6. The adapter of claim 1, wherein said tubular means is formed of two complementary longitudinally symmetrical halves affixed together to form said tubular means.

7. The adapter of claim 6, further comprising a label means for circumferentially surrounding said two complementary longitudinally symmetrical halves and being adhesively attached thereto so as to cause said halves to be affixed together.

8. The adapter of claim 1, wherein said support means further comprises a plurality of elongate slab-like elements affixed to the inner surface of said tubular means and each having a flat surface defining said imaginary cylinder.

9. The adapter of claim 8, wherein said slab-like elements are formed having a plurality of notches so as to present a serated surface lying on said imaginary cylinder.

10. An adapter for permitting a first size battery to be used in place of a second, larger size battery, comprising:
    a tubular means of a diameter and length substantially equal to the diameter and length of the second, larger size battery and having a plurality of elongate longitudinal rib members affixed to the inside of said tubular member each having a flat surface defining an imaginary cylinder of diameter smaller than the diameter of the second larger size battery;
    a stop means arranged inside said tubular means at a distance from said one end equal to the length of the first size battery, said stop means having an aperture formed therein of a size less than the size of the end of the first size battery;
    and disc-shaped metallic electrical contact surface substantially coplanar with the said second end of said tubular means, said contact means including a resilient metallic centrally arranged upraised curved strip formed from said disc for extending through said aperture in said stop means for making electrical contact with the end of the first size battery and for providing a wiping action on the contact, whereby upon insertion the first size battery into the opening for a distance to abut said stop means the combination can be used in place of the second, larger size battery.

* * * * *

UNITED STATES PATENT AND TRADEMARK OFFICE
CERTIFICATE OF CORRECTION

PATENT NO. : 4,397,920
DATED : August 9, 1983
INVENTOR(S) : Burton C. Trattner

It is certified that error appears in the above-identified patent and that said Letters Patent is hereby corrected as shown below:

On the title page add:

-- [73] Assignee: Albert C. Nolte, Jr., Jericho, N. Y. --.

Signed and Sealed this

Twenty-fourth Day of January 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,397,920
DATED : August 9, 1983
INVENTOR(S) : Burton C. Trattner

It is certified that error appears in the above-identified patent and that said Letters Patent are hereby corrected as shown below:

Claim 2, line 2 "if" should be --is--

Claim 10, line 24 "insertion" should be --inserting--

Signed and Sealed this

Twelfth Day of June 1984

[SEAL]

Attest:

GERALD J. MOSSINGHOFF

Attesting Officer     Commissioner of Patents and Trademarks